(12) United States Patent
Taneoka

(10) Patent No.: US 11,434,809 B2
(45) Date of Patent: Sep. 6, 2022

(54) VEHICLE

(71) Applicant: SUBARU CORPORATION, Tokyo (JP)

(72) Inventor: Hideyuki Taneoka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/221,029

(22) Filed: Apr. 2, 2021

(65) Prior Publication Data

US 2021/0317772 A1 Oct. 14, 2021

(30) Foreign Application Priority Data

Apr. 13, 2020 (JP) .............................. JP2020-071604

(51) Int. Cl.
| | |
|---|---|
| *B60K 11/04* | (2006.01) |
| *B60K 11/06* | (2006.01) |
| *F01P 11/10* | (2006.01) |
| *F01P 3/12* | (2006.01) |
| *F01P 7/10* | (2006.01) |

(52) U.S. Cl.
CPC .............. *F01P 7/10* (2013.01); *F01P 2025/04* (2013.01); *F01P 2025/13* (2013.01); *F01P 2025/64* (2013.01)

(58) Field of Classification Search
CPC ....... B60K 11/085; B60K 11/04; B60K 11/06; F01P 11/10; F01P 2025/13; F01P 3/12; F01P 7/02
See application file for complete search history.

(56) References Cited

U.S. PATENT DOCUMENTS

| | | | |
|---|---|---|---|
| 10,329,995 B1* | 6/2019 | Larose, Jr .................. | F01P 3/12 |
| 2015/0007731 A1* | 1/2015 | Shinoda ............. | B01D 53/0462 96/111 |
| 2015/0191078 A1* | 7/2015 | Miyaji ................. | B60K 11/085 701/49 |
| 2016/0237884 A1* | 8/2016 | Yamada ................ | F02B 37/186 |
| 2018/0022210 A1* | 1/2018 | Matsumura ............... | F01P 7/12 123/41.05 |
| 2018/0312039 A1* | 11/2018 | Sakane .................... | B60H 1/16 |

FOREIGN PATENT DOCUMENTS

| | | |
|---|---|---|
| JP | 2015-058754 A | 3/2015 |
| JP | 2015-200194 A | 11/2015 |

* cited by examiner

*Primary Examiner* — Long T Tran
(74) *Attorney, Agent, or Firm* — Smith, Gambrell & Russell, LLP

(57) ABSTRACT

A vehicle includes first and second heat exchangers, a shutter member, first and second detectors, and a control device. The first and second heat exchangers are disposed in an engine room. The first heat exchanger is used for cooling of an engine. The second heat exchanger is used for recovery of exhaust heat of the engine. The shutter member opens and closes a grille opening in a front portion of the engine room. The first detector detects a feed forward system parameter indicating a sign of a load increase the first exchanger or the second heat exchanger. The second detector detects a feedback system parameter indicating that a load in the first exchanger or the second heat exchangers has increased. The control device controls opening and closing of the shutter member and adjusts an opening degree of the shutter member based on the feed forward and feedback system parameters.

20 Claims, 7 Drawing Sheets

VEHICLE

CROSS-REFERENCE TO RELATED APPLICATIONS

The present application claims priority from Japanese Patent Application No. 2020-071604 filed on Apr. 13, 2020, the entire contents of which are hereby incorporated by reference.

BACKGROUND

The disclosure relates to, for example, a vehicle including a grille shutter that is provided at a grille opening in front of an engine room and that can be controlled to open and close.

Automobiles are notable transportation tools in a modern society, and various vehicles move on roads in a daily life. Such vehicles are equipped with heat exchangers such as (i) radiators in which an engine coolant exchanges heat with an outside air and (ii) condensers used in air conditioners.

In order to improve an efficiency of this heat exchanger, a grille shutter (also referred to as an "active grille shutter" or an "AGS") provided in a grille opening is known. The grille shutter can blocks travel wind from the grille opening at a time of starting in winter, for example (See Japanese Unexamined Patent Application Publication (JP-A) No. 2015-58754).

Meanwhile, in recent years, in order to recover an exhaust heat of an engine and effectively use the exhaust heat, mounting of the Rankine cycle on the vehicle has been studied (JP-A No, 2015-200194). JP-A No. 2015-200194 discloses that an efficiency of waste heat regeneration during a cycle is enhanced by controlling opening and closing of the grille shutter.

SUMMARY

An aspect of the disclosure provides a vehicle including a first heat exchanger, a second heat exchanger, a shutter member, a first detector, a second detector, and a control device. The first heat exchanger is disposed in an engine room and configured to be used for cooling of an engine. The second heat exchanger is disposed in the engine room and configured to be used for recovery of exhaust heat of the engine. The shutter member is configured to open and close a grille opening. The grille opening is provided in a front portion of the engine room. The first detector is configured to detect a feed forward system parameter indicating a sign of a load increase in the first heat exchanger or the second heat exchanger. The second detector is configured to detect a feedback system parameter indicating that a load in the first heat exchanger or the second heat exchanger has increased. The control device is configured to control opening and closing of the shutter member. The control device is configured to adjust an opening degree of the shutter member on a basis of the feed forward system parameter and the feedback system parameter to guide a travel wind to the first heat exchanger or the second heat exchanger through the grille opening.

An aspect of the disclosure provides a vehicle including a first heat exchanger, a second heat exchanger, a shutter member, a first sensor, a second sensor, and circuitry. The first heat exchanger is disposed in an engine room and configured to be used for cooling of an engine. The second heat exchanger is disposed in the engine room and configured to be used for recovery of exhaust heat of the engine. The shutter member is configured to open and close a grille opening. The grille opening is provided in a front portion of the engine room. The first sensor is configured to detect a feed forward system parameter indicating a sign of a load increase in the first heat exchanger or the second heat exchanger. The second sensor is configured to detect a feedback system parameter indicating that a load in the first heat exchanger or the second heat exchanger has increased. The circuitry is configured to control opening and closing of the shutter member. The circuitry is configured to adjust an opening degree of the shutter member on a basis of the feed forward system parameter and the feedback system parameter to guide a travel wind to the first heat exchanger or the second heat exchanger through the grille opening.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

Figure 1:
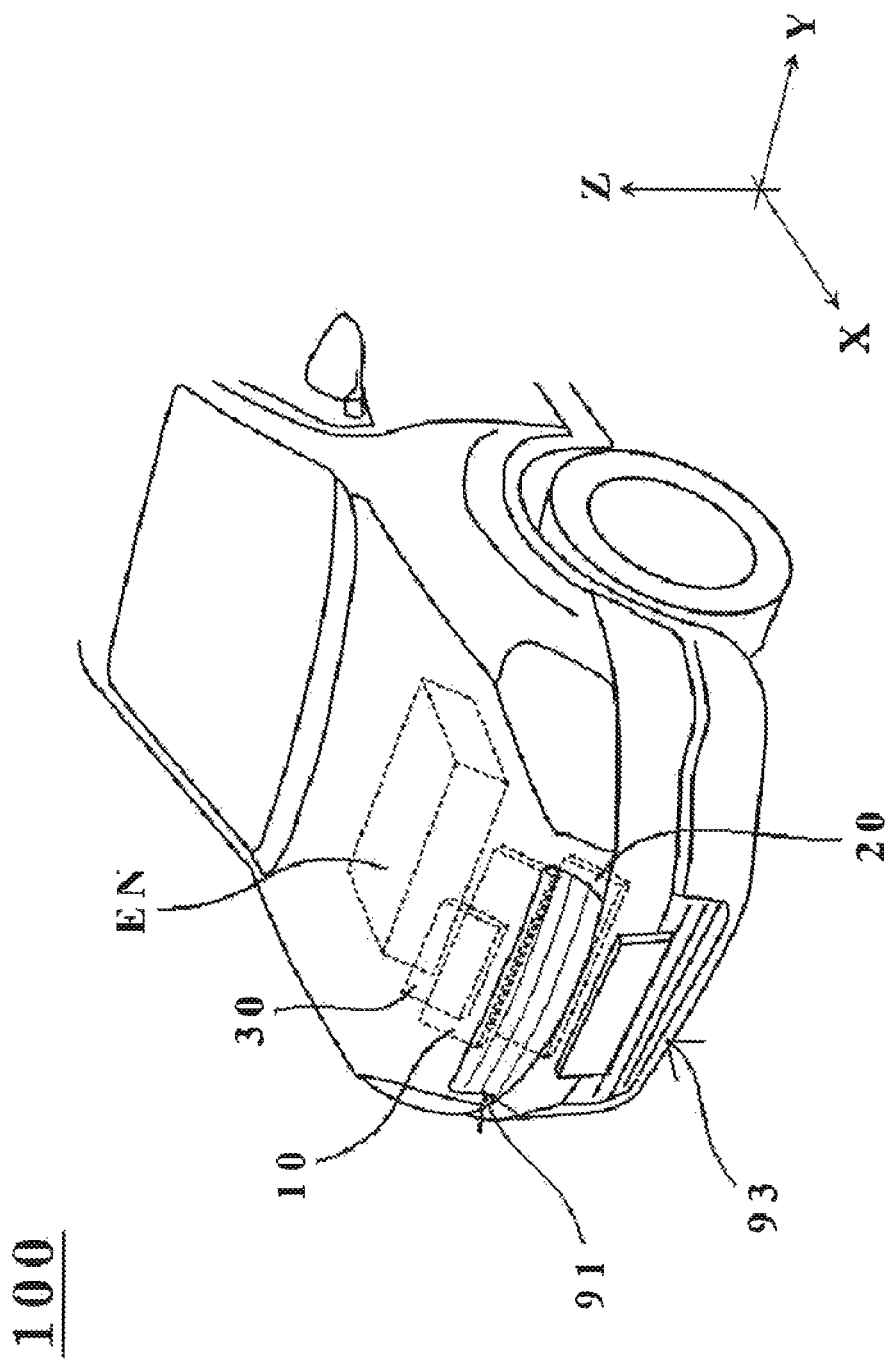
FIG. 1 is a schematic view partially illustrating a vehicle of an embodiment.

DETAILED DESCRIPTION current technologies (which are not limited to the above-mentioned JP-A No. 2015-58754 and JP-A No. 2015-200194) do not satisfy market's demands, and the following issues exist.

For example, in JP-A No. 2015-58754 and JP-A No. 2015-200194 opens or closes a grille shutter to improve an efficiency of a heat exchange with the outside in a heat exchanger in an engine room.

However, for example, as illustrated in JP-A No. 2015-200194, an exhaust heat recovery system using the Rankine cycle is also mounted in the engine room, and plural heat exchangers are provided in the engine room. In this case, it is not sufficient to merely improve an efficiency of individual heat exchangers by simply opening and closing the grille shutter, and an efficiency of the plural heat exchangers provided in the engine room is to be improved totally.

It is desirable to provide a vehicle equipped with plural heat exchangers in an engine room that can distribute travel wind (cooling air) in an improved manner according to a situation.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. In the specification and the drawings, elements having substantially the same functional configuration are designated by the same reference numerals, and a duplicate description thereof will be omitted. In the specification and the drawings, plural elements having substantially the same functional configuration may be distinguished by adding different alphabets after the same reference numeral. However, when it is not necessary to particularly distinguish the plural elements having substantially the same functional configuration from each other, the same reference numeral may be simply given. Regarding configurations other than those described in detail below, elemental technologies and configurations relating to known fuel cell systems including JP-A No. 2015-58754 and JP-A No. 2015-200194 may be appropriately supplemented.

Vehicle 100

First, a configuration of a vehicle 100 will be described with reference to FIGS. 1 to 3. Hereinafter, a vehicle height direction of the vehicle is described as a Z direction, a vehicle longitudinal direction is described as an X direction, and a vehicle width direction orthogonal to the X direction and the Z direction is described as a Y direction.

The vehicle 100 of the embodiment can guide the travel wind to plural heat exchangers through a grille opening (an upper grille opening 91 in this example). The vehicle 100 includes a first heat exchanger 10, a second heat exchanger 20, a third heat exchanger 30, a first shutter member 40, a first detector $DT_1$, a second detector $DT_2$, and a control device 50. For configurations other than the configurations described in detail below, for example, a known vehicle structure such as those described in JP-A No. 2015-200194 may be employed.

The first heat exchanger 10 is disposed in an engine room ER and is used for air conditioning control in a vehicle cabin. An example of the first heat exchanger 10 of the embodiment is a condenser (hereinafter, also referred to as a "first condenser") of an air conditioner mounted on the vehicle 100.

The second heat exchanger 20 is disposed in the engine room ER and is used for recovery and utilization of exhaust heat of an engine EN. An example of the second heat exchanger 20 of the embodiment is a Rankine cycle condenser for exhaust heat recovery (hereinafter, also referred to as a "second condenser").

The third heat exchanger 30 is disposed in the engine room ER and is used for cooling the engine EN. An example of the third heat exchanger 30 of the embodiment is a coolant radiator in which a coolant of the engine EN flows and heat is exchanged between the coolant and an outside air.

Figure 2:
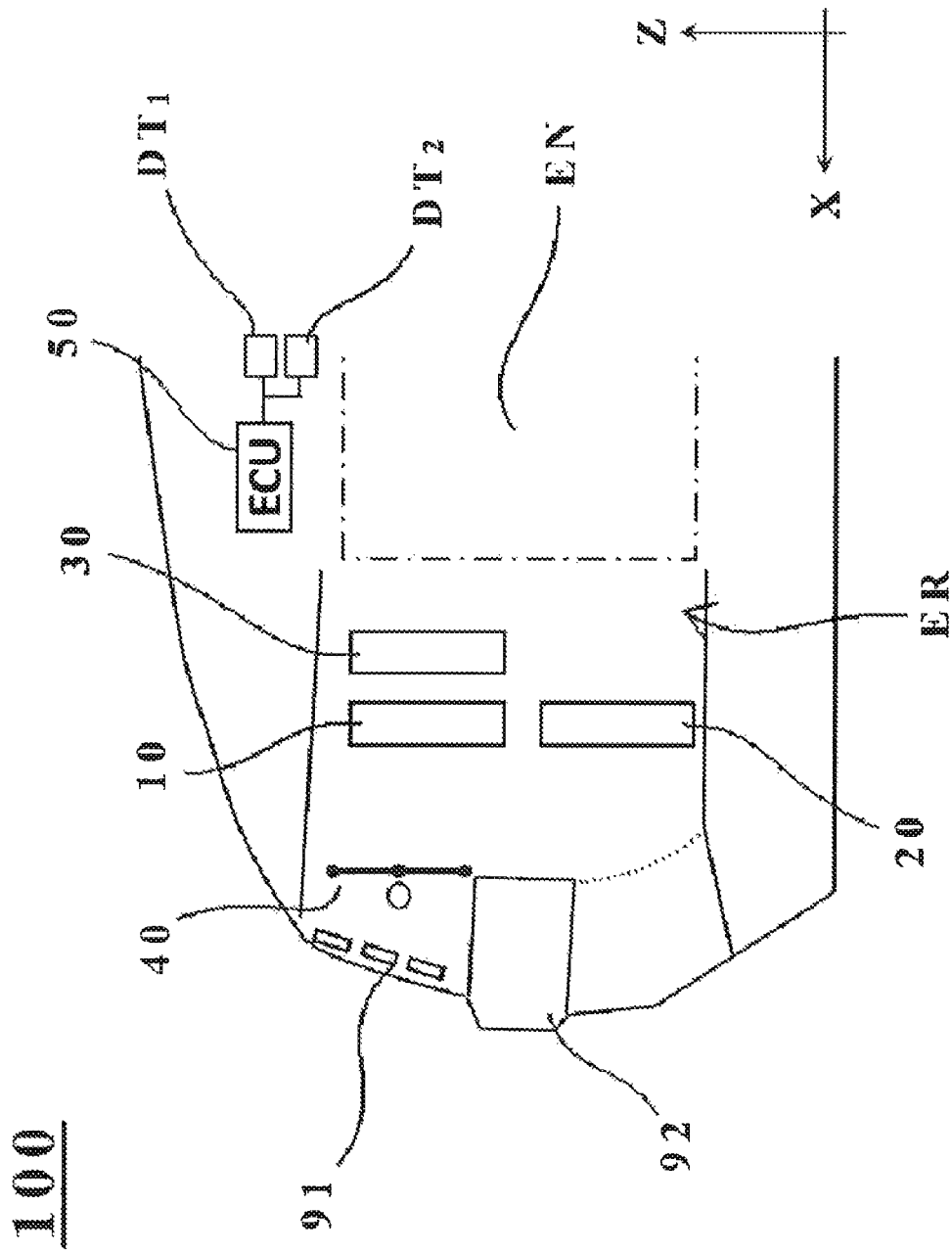
FIG. 2 is a schematic view illustrating an arrangement of plural heat exchangers and a shutter member (AGS) mounted on the vehicle of the embodiment.

FIG. 2 illustrates an arrangement of the first heat exchanger 10 to the third heat exchanger 30 in the engine room ER. The arrangement described below is an example. Another arrangement may be adopted if the arrangement do not deviate from the gist of the disclosure.

As illustrated in FIG. 2, the first heat exchanger 10 of the embodiment is disposed in a relatively front portion together with the second heat exchanger 20 among the three heat exchangers. In other words, the first heat exchanger 10 of the embodiment is disposed in front of the third heat exchanger 30.

The second heat exchanger 20 is arranged in front of the third heat exchanger 30 together with the first heat exchanger 10 as described above, and is disposed below the first heat exchanger 10 in the vehicle height direction. In other words, the second heat exchanger 20 is disposed below the first heat exchanger 10 and the third heat exchanger 30 in the vehicle height direction.

The third heat exchanger 30 is disposed in a relatively rear portion among the three heat exchangers. In the embodiment, the third heat exchanger 30 is disposed between the first heat exchanger 10 and the engine EN.

As can be understood from FIG. 2, the upper grille opening 91 as the grille opening is provided in front of the first heat exchanger 10 and the third heat exchanger 30 and above a bumper beam 92. Further, in the embodiment, the first shutter member 40 (also referred to as an "active grille shutter" or an "AGS") which can be controlled to open and close is provided in the upper grille opening 91.

The first shutter member 40 opens and closes the upper grille opening 91 provided in the front portion of the engine room ER. An opening degree of the first shutter member 40 can be adjusted under control of the control device 50 as described later. A specific structure of the shutter member is not particularly limited if the above functions of the embodiment are exhibited. Any of known shutter structures including the above-mentioned JP-A No. 2015-58754 and JP-A No. 2015-200194 can be employed. In one embodiment, the first shutter member 40 may serve as a "shutter member".

The first detector $DT_1$ detects feed forward system parameters (also referred to as FF system parameters) indicating a sign of a load increase in at least one selected from the group consisting of the first heat exchanger 10 to the third heat exchanger 30. Examples of such FF system parameters include an external temperature, an atmospheric pressure around the vehicle 100, an output of the engine EN, and a rotation speed of the engine EN.

Further, the FF system parameters may include at least one selected from the group consisting of an air-fuel ratio of the engine EN and information on a gradient of a road surface on which the vehicle 100 travels. Such parameters can also be detected by a known detection sensor mounted on the vehicle 100. The information on the gradient of the road surface may be obtained by referring to map information of a navigation system.

At least one selected from the group consisting of these FF system parameters may be used in adjusting the opening degree of the AGS (which will be described later). As a specific configuration of such a first detector $DT_1$, any of various known sensors capable of detecting the above-described various parameters may be used.

The second detector $DT_2$ detects feedback system parameters (FB system parameters) indicating that a load in the at least one selected from the group consisting of the first heat exchanger 10 to the third heat exchanger 30 has increased.

Examples of such FB system parameters include a coolant temperature of the engine EN, a vapor pressure on a high pressure side in a working fluid used for the exhaust heat recovery of the Rankine cycle, a vapor temperature on the high pressure side, a liquid temperature on a low pressure side in the working fluid, and a flow rate of the working fluid. These FB system parameters can also be acquired from various known in-vehicle sensors mounted on the vehicle 100.

The control device 50 controls opening and closing of the first shutter member 40. In one example, the control device 50 of the embodiment adjusts the opening degree of the first shutter member 40 based on the FF system parameters detected by the first detector $DT_1$ and the FB system parameters detected by the second detector $DT_2$, to guide the travel wind to any of the heat exchangers (for example, either one of the first heat exchanger 10 and the second heat exchanger 20) through the grille opening.

Opening Degree Pattern of AGS

Next, an opening degree pattern of the first shutter member 40 of the embodiment will be described with reference to FIG. 3. As described above, the first shutter member 40 of the embodiment can adjust which of the plural heat exchangers in the engine room ER the travel wind is guided to, under the control of the control device 50.

Figure 3:
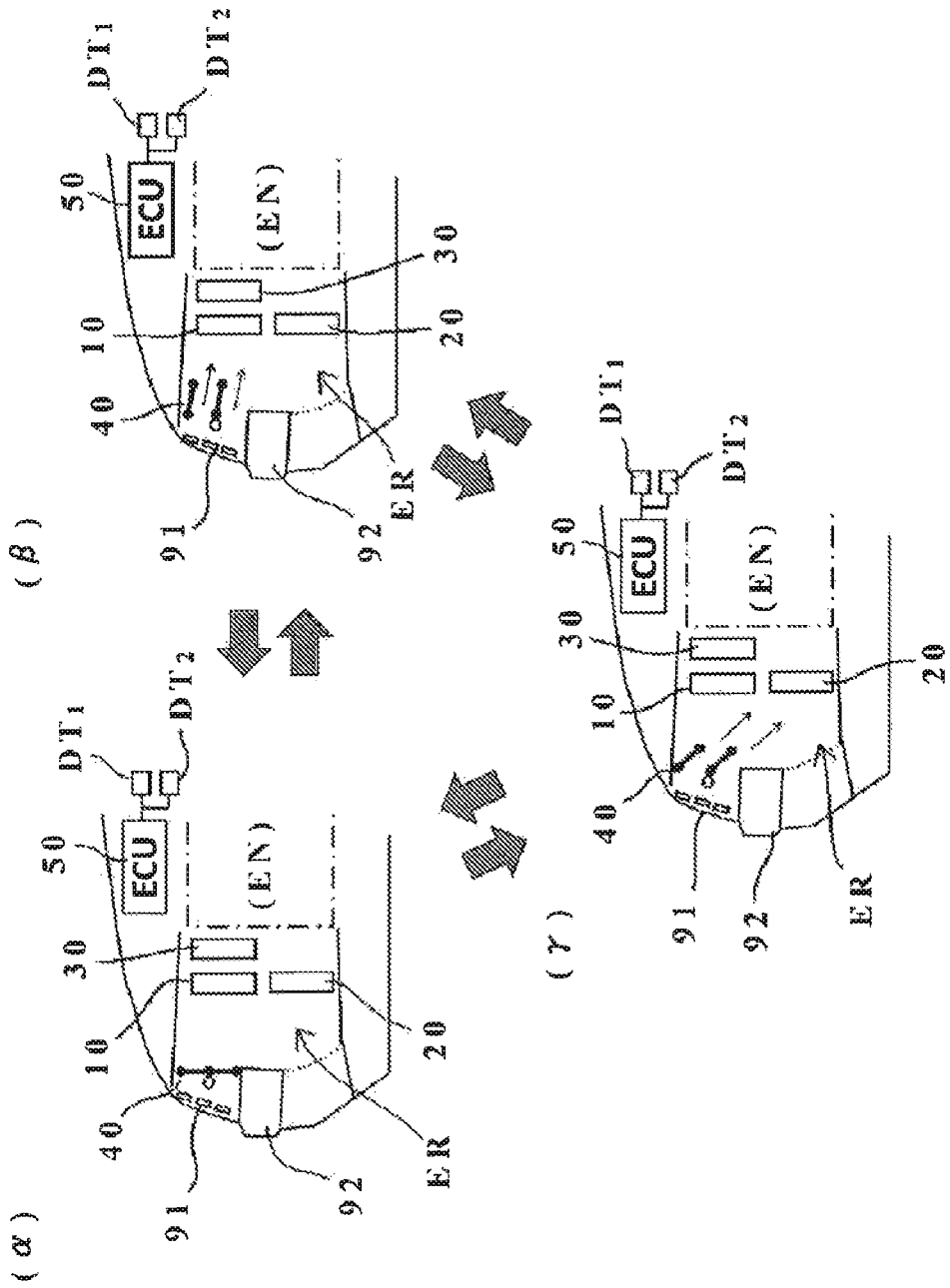
FIG. 3 is a schematic view illustrating a state transition of the shutter member (AGS) mounted on the vehicle of the embodiment.

In one example, as is clear from FIG. 3, the first shutter member 40 can take at least three opening degree patterns (an opening degree of the first shutter member 40) of a pattern α, a pattern β, and a pattern γ.

First, the pattern α is a so-called closed state, and is a state in which the upper grille opening 91 is closed by the first shutter member 40. When the opening degree pattern is the pattern α, the travel wind is prevented from entering the engine room ER through the upper grille opening 91. Accordingly, a temperature rise of a heat source (that is, the engine EN) having a low temperature, for example, at a time of starting can be accelerated.

The pattern β is a first wind guide mode which will be described later, and is a state in which the upper grille opening 91 is opened by the first shutter member 40, and the travel wind is directly guided to the first heat exchanger 10 and the third heat exchanger 30.

In other words, when the opening degree pattern is the pattern β, the travel wind enters the engine room ER from the upper grille opening 91, but does not go directly to the second heat exchanger 20, and the second heat exchanger 20 is prevented from being excessively cooled by the travel wind. Accordingly, the first heat exchanger 10 and the third heat exchanger 30 are preferentially cooled, so as to prevent overheating of the vehicle.

The pattern γ is a second wind guide mode which will be described later, and is a state in which the upper grille opening 91 is opened by the first shutter member 40 and the travel wind is directly guided to the second heat exchanger 20.

In other words, when the opening degree pattern is the pattern γ, the travel wind enters the engine room ER from the upper grille opening 91, but does not go directly to the first heat exchanger 10 or the third heat exchanger 30, and the heat exchangers 10 and 30 are prevented from being excessively cooled by the travel wind. Accordingly, the travel wind for the first heat exchanger 10 and the like is also guided to the second heat exchanger 20 (a Rankine condenser in the example), and a heat source temperature can be achieved and a condensing capacity can be strengthened at the same time.

The first shutter member 40 of the embodiment may further include an opening degree pattern of a pattern N (not illustrated) which will be described below, under the control of the control device 50. The pattern N is a so-called normal ventilation mode, and corresponds to a state where the upper grille opening 91 is opened by the first shutter member 40 and the travel wind is guided evenly to all the heat exchangers of the first heat exchanger 10 to the third heat exchanger 30.

The opening degree pattern of such a pattern N can be set through simulations, experiments, and the like based on, for example, a shape of the engine room ER and a layout of components such as the engine EN. Accordingly, the second heat exchanger 20 can be cooled while cooling the first heat exchanger 10 and the third heat exchanger 30, so that the condensing capacity can also be enhanced while preventing the overheating.

Select Opening Degree Pattern of AGS based on FF System Parameters and FB System Parameters Next, description, will be given on selecting the opening degree pattern of the AGS (the first shutter member 40 and a second shutter member 41 in the specification) based on the FF system parameters and the FB system parameters.

That is, the control device 50 of the embodiment adjusts the opening degree of the first shutter member 40 based on both (i) at least one selected from the FF system parameters and (ii) at least one selected from the FB system parameters.

For example, the control device 50 may use the external temperature as the FF system parameter and the coolant temperature of the engine EN as the FB system parameter. When the external temperature and the coolant temperature are within a predetermined range (for example, the external temperature is in a medium temperature range, and the coolant temperature is in a medium temperature range), the control device 50 may adjust the opening degree of the first shutter member 40 so as to guide the travel wind from the upper grille opening 91 toward to the second heat exchanger 20 while blocking the travel wind from going to the first heat exchanger 10.

In the embodiment, the above combination is illustrated as an example. An improved opening degree pattern can be set through the experiments or the simulations based on a combination of another FF system parameter(s) and another FB system parameter(s). Table 1 illustrates an example of selecting the opening degree pattern based on a combination of the FF system parameters and the FB system parameters.

TABLE 1

| | | | Engine coolant temperature | | | Feedback system parameters | | |
|---|---|---|---|---|---|---|---|---|
| | | | | | | 10 kPa ≤ vapor pressure on high pressure side in Rankine cycle | 80° C. ≤ vapor temperature on high pressure side in Rankine cycle | 35° C ≤ liquid temperature on low pressure side in Rankine cycle |
| | | | At low temperatures (<90° C.) | At medium temperatures (90° C. to 100° C.) | At high temperatures (100° C.<) | | | |
| Feed forward system parameters | External temperature | At low temperatures (<15° C.) | Pattern α | Pattern γ | Pattern β | Pattern α | Pattern α | Pattern α |
| | | At medium temperatures (15° C. to 27° C.) | Pattern α | Pattern γ | Pattern β | Pattern α or pattern β | Pattern α or pattern β | Pattern α or pattern β |

TABLE 1-continued

| | | Engine coolant temperature | | | Feedback system parameters | | |
|---|---|---|---|---|---|---|---|
| | | | | | 10 kPa ≤ vapor pressure on high pressure side in Rankine cycle | 80° C. ≤ vapor temperature on high pressure side in Rankine cycle | 35° C ≤ liquid temperature on low pressure side in Rankine cycle |
| | | At low temperatures (<90° C.) | At medium temperatures (90° C. to 100° C.) | At high temperatures (100° C.<) | | | |
| At high temperatures (27° C.<) 15 kW ≤ engine output 2400 rpm ≤ engine speed 15.0 ≤ air-fuel ratio | | Pattern α Pattern α Pattern β Pattern β | Pattern β Pattern β Pattern β Pattern β | Pattern β Pattern β Pattern β Pattern β | Pattern β Pattern β Pattern β Pattern β | Pattern β Pattern β Pattern β Pattern β | Pattern β Pattern β Pattern β Pattern β |

Accordingly, in the embodiment, it is possible to distribute the travel wind with the AGS to the plural heat exchangers in the engine room ER in an improved manner, based on (i) a factor (that is, the FF system parameter) of increasing a future load in the at least one selected from the group consisting of the first heat exchanger 10 to the third heat exchanger 30 and (ii) a factor (that is, the FB system parameter) of increasing an actual load in the at least one selected from the group consisting of the first heat exchanger 10 to the third heat exchanger 30.

Method of Controlling Opening Degree of First Shutter Member 40 (AGS)

Figure 4:
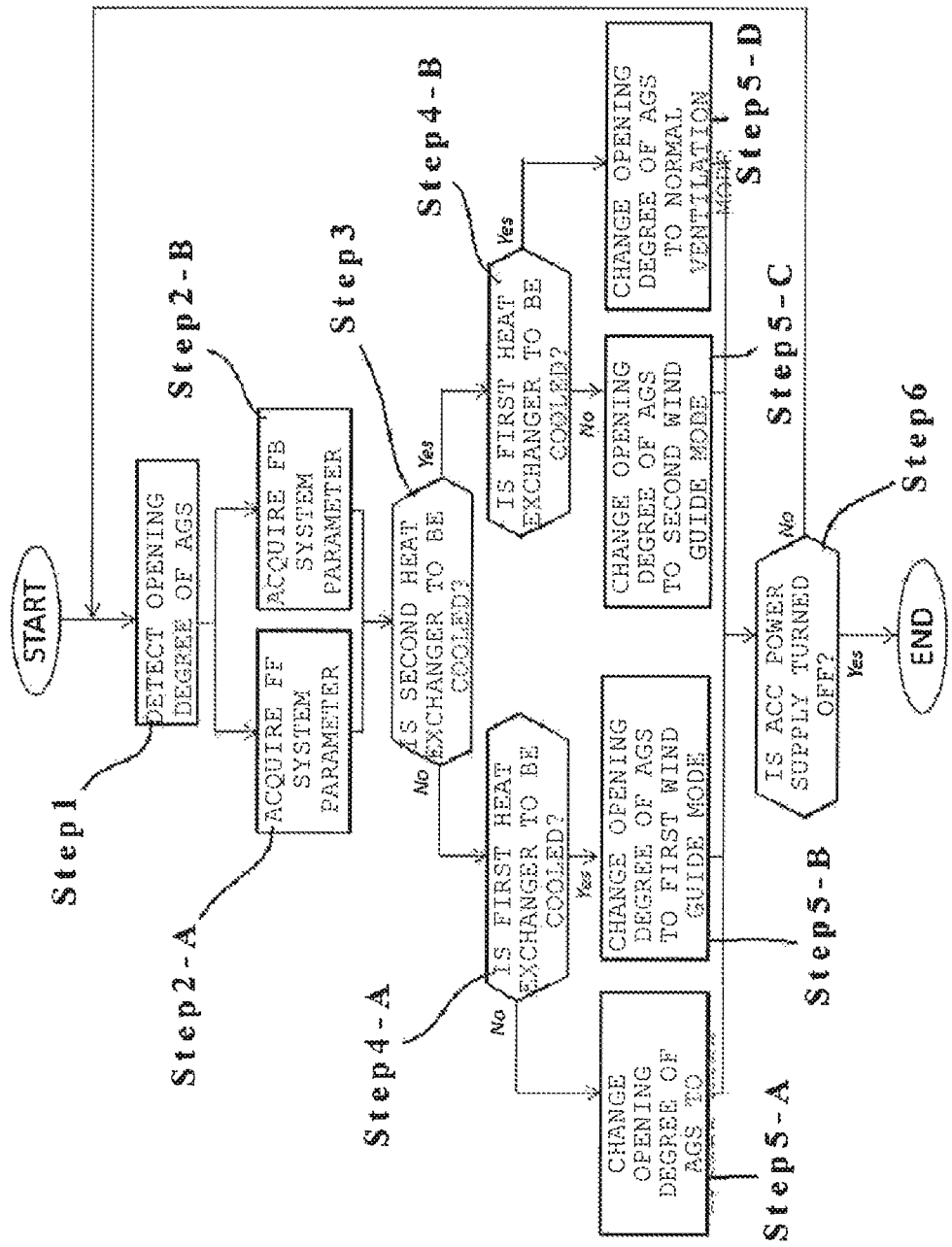
FIG. 4 is a flowchart of a method of controlling an opening degree of the shutter member (AGS).

Next, with reference to FIG. 4, a method of controlling the opening degree of the first shutter member 40 executed by the control device 50 of the embodiment will be described. In the following description, an example of selecting the opening degree pattern of the first shutter member 40 using both the FF system parameter and the FB system parameter will be described. It is noted that the disclosure is not limited to the above. The opening degree pattern of the first shutter member 40 may be selected using at least one selected from the group consisting of the FF system parameters and the FB system parameters, for example.

First, when the engine is started by turning on an ACC power supply or the like, the opening degree of the first shutter member 40 (AGS) is detected in step 1. At this time, step 1 may be skipped if a default state is set, for example, to the pattern α when the engine is turned off.

Next, in step 2, the FF system parameter is acquired via the first detector $DT_1$ (step 2-A), and the FB system parameter is acquired via the second detector $DT_2$ (step 2-B).

Then, in the following step 3, the control device 50 determines whether the second heat exchanger 20 (the condenser for the Rankine cycle in the embodiment) is to be cooled. Then, when the control device 50 determines in step 3 that it is not necessary to cool the second heat exchanger 20, the process proceeds to step 4-A, while when the control device 50 determines that the second heat exchanger 20 is to be cooled, the process proceeds to step 4-B.

In step 4-A, the control device 50 subsequently determined whether the first heat exchanger 10 is to be cooled. At this time, the control device 50 may further determine in step 4-A whether the third heat exchanger 30 is to be cooled, or may determine whether the third heat exchanger 30 is to be cooled instead of the first heat exchanger 10.

When the control device 50 determines in step 4-A that it is not necessary to cool the first heat exchanger 10 (and/or the third heat exchanger 30), it is not necessary to cool any of the heat exchangers. Thus, the process proceeds to step 5-A, and the opening degree pattern of the first shutter member 40 (AGS) is controlled to be the pattern α (the closed mode).

On the other hand, when the control device 50 determines in step 4-A that the first heat exchanger 10 (and/or the third heat exchanger 30) are to be cooled, the process proceeds to step 5-B. In step 5-B, in order to preferentially guide the travel wind to the first heat exchanger 10 (and/or the third heat exchanger 30), the opening degree pattern of the first shutter member 40 (AGS) is controlled to be the pattern β (the first wind guide mode).

In step 4-B, the control device 50 determines whether the first heat exchanger 10 is to be cooled as in step 4-A. At this time, the control device 50 may further determine in step 4-B whether the third heat exchanger 30 is to be cooled, or may determine whether the third heat exchanger 30 is to be cooled instead of the first heat exchanger 10.

When determining in step 4-B that it is not necessary to cool the first heat exchanger 10 (and/or the third heat exchanger 30), the control device 50 determines that the second heat exchanger 20 is to be preferentially cooled. The process proceeds to step 5-C, and the opening degree pattern of the first shutter member 40 (AGS) is controlled to be the pattern γ (the second wind guide mode).

On the other hand, when the control device 50 determines in step 4-B that the first heat exchanger 10 (and/or the third heat exchanger 30) are to be cooled, the process proceeds to step 5-D. In order to evenly guide the travel wind to the first heat exchanger 10 and the second heat exchanger 20 (also to the third heat exchanger 30 if necessary), the opening degree pattern of the first shutter member 40 (AGS) is controlled to be the pattern N (the normal ventilation mode).

In step 6, the control device 50 determines whether the ACC power supply of the vehicle 100 is turned off, for example, when the vehicle arrives at a destination. Then, when the vehicle 100 is still driven (No in step 6), the process returns to step 1 and the above process is repeated again. On the other hand, when the ACC power supply is turned off, the opening degree control of the first shutter member 40 (AGS) of the embodiment is ended.

According to the vehicle equipped with the AGS of the embodiment described above, the opening degree of the first shutter member 40 (AGS) is adjusted based on values of the FF system parameters and/or the FB system parameters, so that it is possible to distribute the travel wind to the plural heat exchangers in the engine room ER in the improved manner.

Each of the above-described embodiments is a mere example of the disclosure. New structures and controls may be implemented by appropriately combining the elements of the embodiments if the structures and controls do not deviate from the gist of the disclosure. Hereinafter, modified examples applicable to the embodiment will be described.

FIRST MODIFIED EXAMPLE

Figure 5:
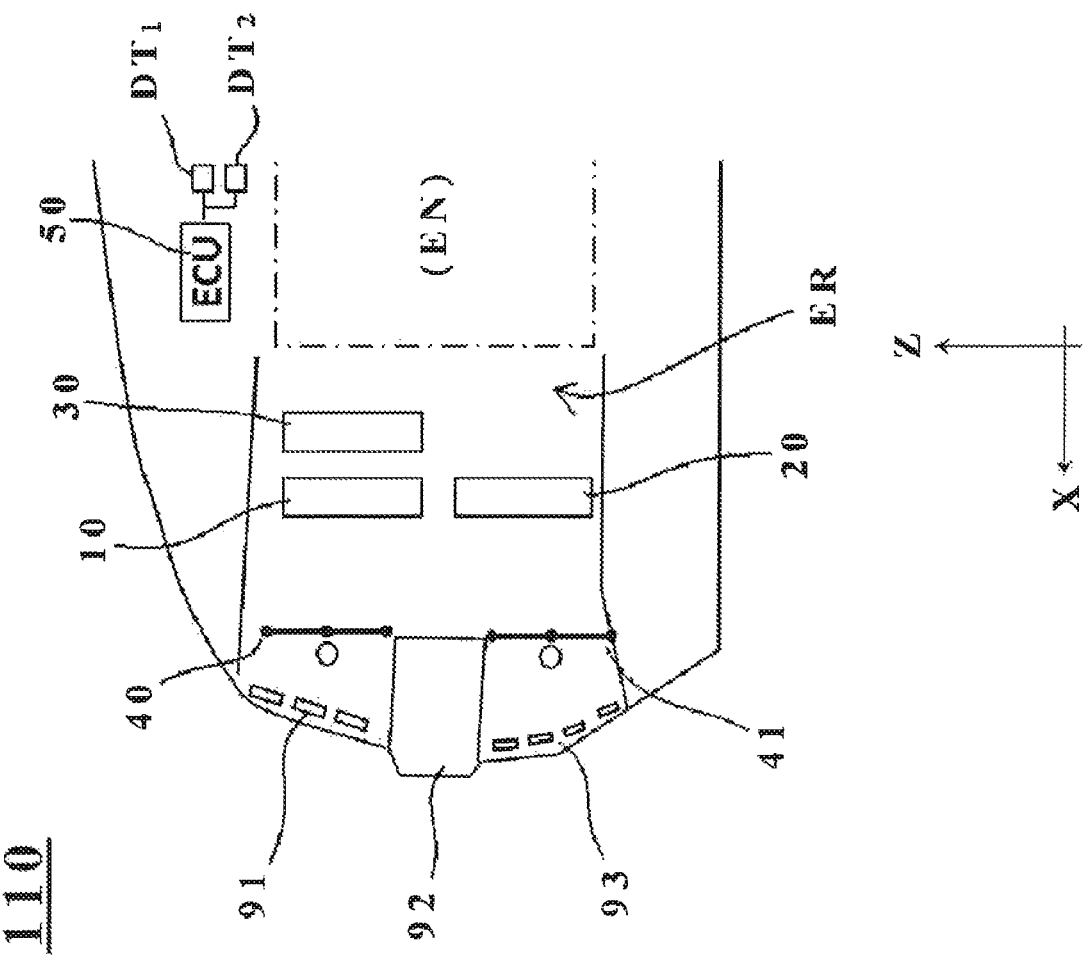
FIG. 5 is a schematic view illustrating an arrangement of a shutter member (AGS) of a first modified example.

FIG. 5 illustrates an arrangement of a shutter member (AGS) in a first modified example of the embodiment. In the above embodiment, the upper grille opening 91 is provided as the grille opening, and the opening and closing control is performed by the first shutter member 40, A vehicle 110 of the first modified example is further provided with a lower grille opening 93 and the second shutter member 41. Therefore, in the following, configurations having the same functions as those in the embodiment will be given the same reference numerals, and the description thereof will be omitted as appropriate.

That is, as illustrated in FIG. 5, the vehicle 110 of the first modified example includes the upper grille opening 91 above the bumper beam 92 and the lower grille opening 93 below the bumper beam 92. Accordingly, the travel wind can flow into the engine room ER not only from the upper grille opening 91 but also from the lower grille opening 93.

The second shutter member 41 has the same structure as the first shutter member 40 described above, and the opening degree of the second shutter member 41 can be set independently of that of the first shutter member 40. In other words, under the control of the control device 50, the second shutter member 41 can cooperate with the first shutter member 40 to take (i) the closed mode that closes the lower grille opening 93, (ii) the first wind guide mode that guides the travel wind to the first heat exchanger 10, (iii) the second wind guide mode that guides the travel wind to the second heat exchanger 20, and the like. At this time, similar to the above embodiment, the control device 50 can set the opening degree patterns of the shutter members based on the values of the FF system parameters and the FB system parameters.

Figure 6:
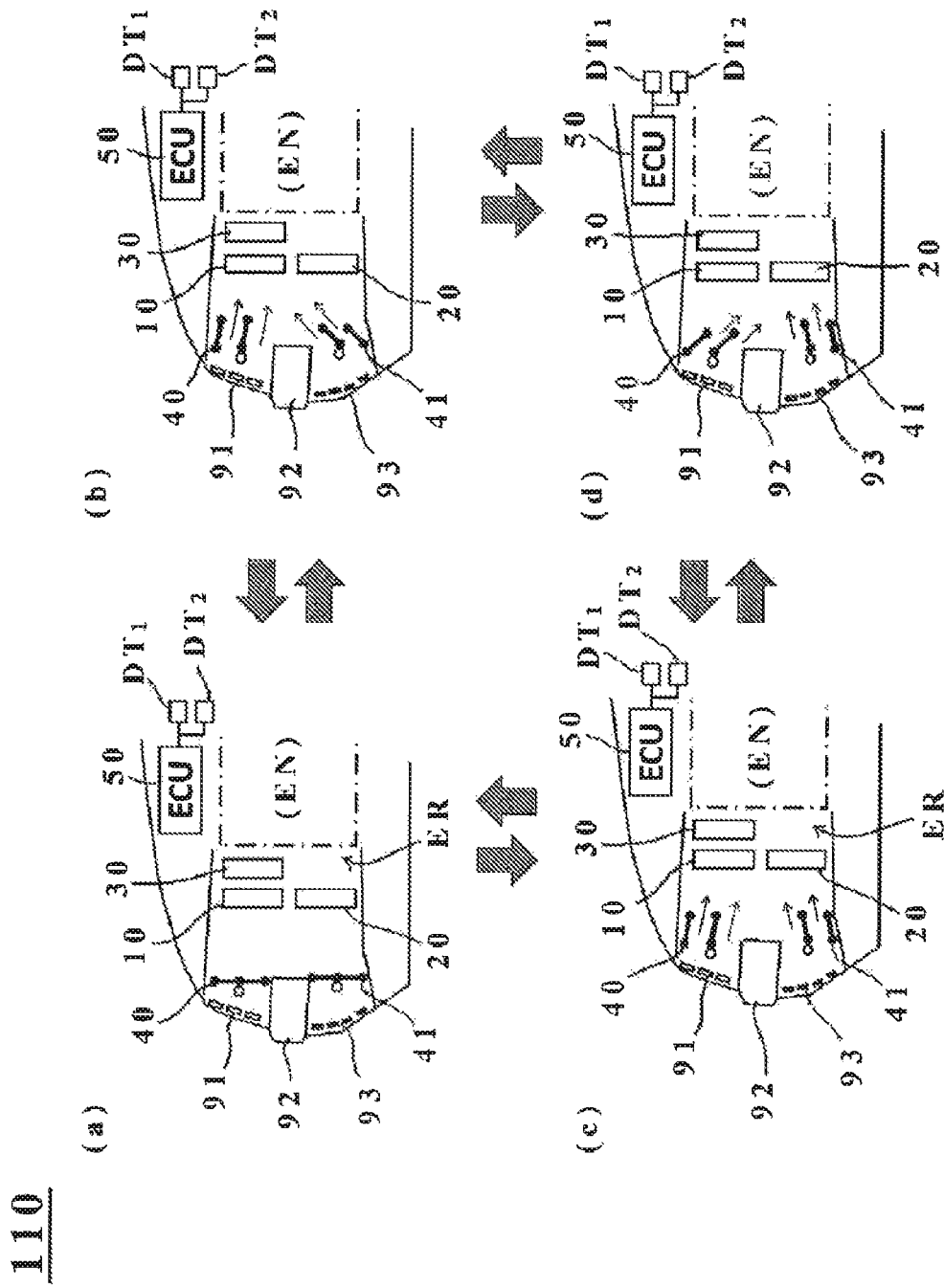
FIG. 6 is a schematic view illustrating a state transition of a shutter member (AGS) of a second modified example.

FIG. 6 illustrates an example of the wind guide modes that the shutter members (the first shutter member 40 and the second shutter member 41) of the first modified example can take.

That is, a part (a) of FIG. 6 illustrates the closed mode. The shutter members close the respective grille openings to prevent the travel wind from flowing into the engine room ER. A part (b) of FIG. 6 illustrates the first wind guide mode. The shutter members can directly guide the travel wind that flows from the respective grille openings to the first heat exchanger 10 (and/or the third heat exchanger 30).

A part (c) of FIG. 6 illustrates the normal ventilation mode described in the above embodiment. The shutter members can evenly flow the travel wind that flows from the respective grille openings into both the first heat exchanger 10 (and/or the third heat exchanger 30) and the second heat exchanger 20.

A part (d) of FIG. 6 illustrates the second wind guide mode. The shutter members can directly guide the travel wind that flows from the respective grille openings to the second heat exchanger 20.

As described above, the shutter members of the first modified example include the plural shutter members (that is, the first shutter member 40 and the second shutter member 41) whose opening degrees can be adjusted independently of each other. The control device 50 controls these shutter members, so that the travel wind can be more effectively guided to the heat exchangers.

SECOND MODIFIED EXAMPLE

Figure 7:
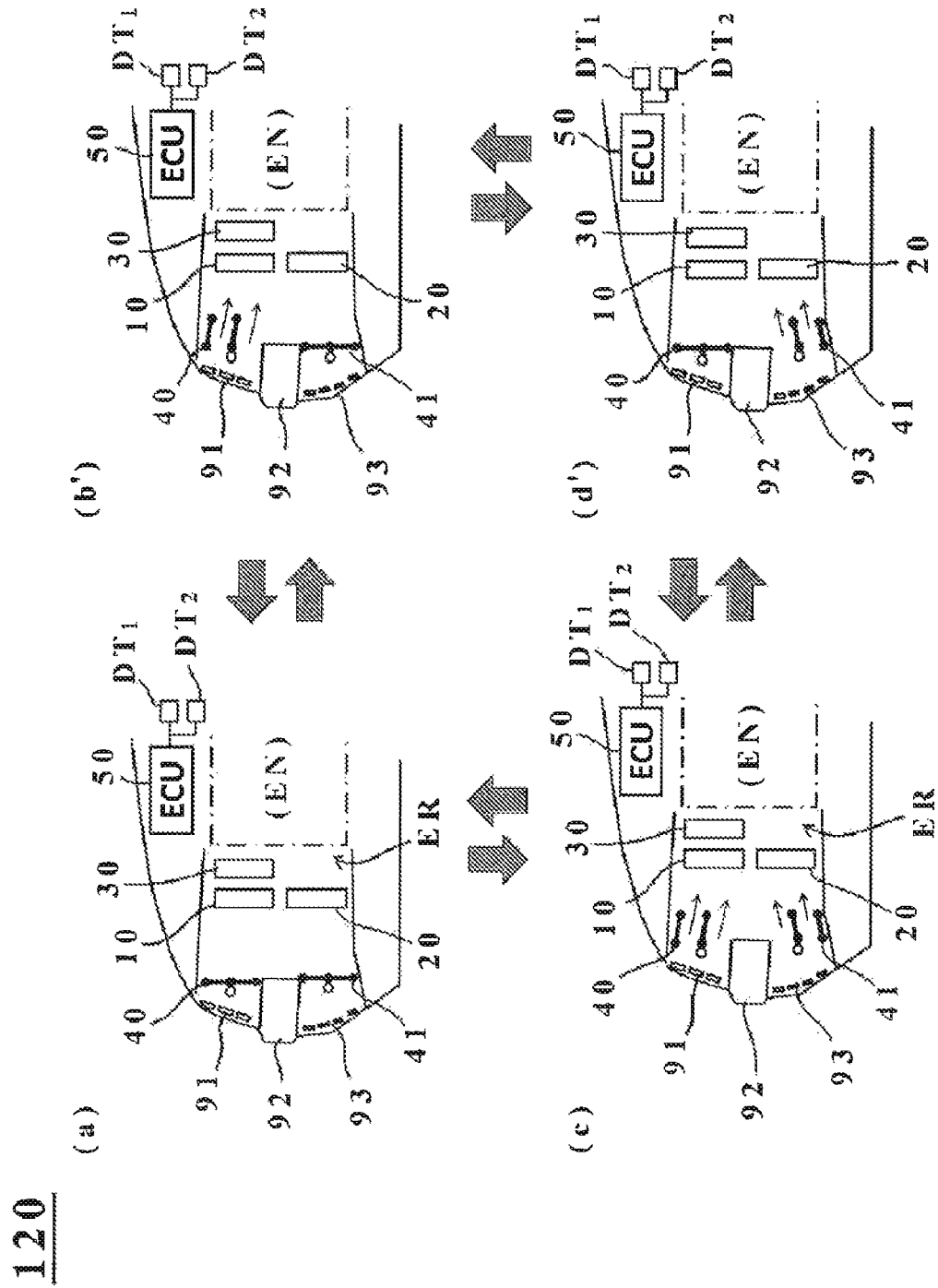
FIG. 7 is a schematic view illustrating a state transition of a shutter member (AGS) of a third modified example.

FIG. 7 illustrates an arrangement of a shutter member (AGS) of a second modified example of the embodiment. In the first modified example, the first shutter member 40 and the second shutter member 41 cooperate to guide the travel wind to the heat exchangers. In contrast, in the second modified example, the first shutter member 40 and the second shutter member 41 are dedicated to heat exchangers, respectively.

That is, as illustrated in FIG. 7, in a vehicle 120 of the second modified example, the first heat exchanger 10 (and/or the third heat exchanger 30) is configured such that the travel wind is guided by the first shutter member 40, and the second heat exchanger 20 is configured such that the travel wind is guided by the second shutter member 41. That is, as illustrated in a part (b') of FIG. 7, when the shutter member is in the first wind guide mode, the second shutter member 41 closes the lower grille opening 93 in the second modified example.

Further, as illustrated in a part (d') of FIG. 7, when the shutter member is in the second wind guide mode, the first shutter member 40 closes the upper grille opening 91 in the second modified example. As described above, in the disclosure, the first shutter member 40 and the second shutter member 41 may cooperate to guide the travel wind to the engine room ER. It is noted that the disclosure is not limited to this example. It is not necessarily for the first shutter member 40 and the second shutter member 41 to cooperate to guide the travel wind as described in the second modified example.

In addition to effects of the embodiment, the first modified example or the second modified example can also more efficiently guide the travel wind to the engine room ER from the plural openings provided on a front portion of the vehicle.

The control device 50 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control device 50 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control device 50 illustrated in FIG. 2.

The invention claimed is:
1. A vehicle comprising:
a first heat exchanger disposed in an engine room and configured to be used for cooling of an engine;
a second heat exchanger that is disposed in the engine room, comprises an exhaust heat recovery system con- denser, and is configured to be used for recovery of exhaust heat of the engine;

a shutter member configured to open and close a grille opening, the opening being provided in a front portion of the engine room;

a first detector configured to detect a feed forward system parameter indicating a sign of a load increase in the first heat exchanger or the second heat exchanger;

a second detector configured to detect a feedback system parameter indicating that a load in the first heat exchanger or the second heat exchanger has increased; and a control device configured to control opening and closing of the shutter member, wherein the control device is configured to adjust an opening degree of the shutter member on a basis of the feed forward system parameter and the feedback system parameter to guide a travel wind through the grille opening and toward a respective one or both of the first heat exchanger and the second heat exchanger so as to implement one of a plurality of predetermined travel wind patterns that direct the travel wind past the shutter member and toward the respective one or both of the first and second heat exchangers on the basis of the feed forward system parameter input and the feedback system parameter input to the control device.

2. The vehicle according to claim 1, wherein the feed forward system parameter comprises at least one of an external temperature around the vehicle, an atmospheric pressure, an output of the engine, and/or a rotation speed of the engine.

3. The vehicle according to claim 2, wherein the feed forward system parameter further comprises at least one of an air-fuel ratio of the engine and/or information on a gradient of a road surface on which the vehicle travels.

4. The vehicle according to claim 3, wherein the feedback system parameter comprises at least one of a coolant temperature of the engine, a vapor pressure on a high pressure side in a working fluid used for the recovery of the exhaust heat, a vapor temperature on the high pressure side, a liquid temperature on a low pressure side in the working fluid, and/or a flow rate of the working fluid.

5. The vehicle according to claim 4, wherein the feed forward system parameter comprises the external temperature, the feedback system parameter comprises the coolant temperature of the engine, and the control device is configured to, when the external temperature and the coolant temperature are within respective predetermined ranges, adjust the opening degree of the shutter member so as to implement a selected one of the plurality of predetermined travel wind patterns which directs the travel wind to the second heat exchanger while blocking the travel wind from going from the grille opening to the first heat exchanger.

6. The vehicle according to claim 3, wherein the feed forward system parameter comprises the external temperature, the feedback system parameter comprises a coolant temperature of the engine, and the control device is configured to, when the external temperature and the coolant temperature are within respective predetermined ranges, adjust the opening degree of the shutter member so as to implement a selected one of the plurality of predetermined travel wind patterns which directs the travel wind to the second heat exchanger while blocking the travel wind from going from the grille opening to the first heat exchanger.

7. The vehicle according to claim 2, wherein the feedback system parameter comprises at least one of a coolant temperature of the engine, a vapor pressure on a high pressure side in a working fluid used for the recovery of the exhaust heat, a vapor temperature on the high pressure side, a liquid temperature on a low pressure side in the working fluid, and/or a flow rate of the working fluid.

8. The vehicle according to claim 7, wherein the feed forward system parameter comprises the external temperature, the feedback system parameter comprises the coolant temperature of the engine, and the control device is configured to, when the external temperature and the coolant temperature are within respective predetermined ranges, adjust the opening degree of the shutter member so as to implement a selected one of the plurality of predetermined travel wind patterns which directs the travel wind to the second heat exchanger while blocking the travel wind from going from the grille opening to the first heat exchanger.

9. The vehicle according to claim 2, wherein the feed forward system parameter comprises the external temperature, the feedback system parameter comprises a coolant temperature of the engine, and the control device is configured to, when the external temperature and the coolant temperature are within respective predetermined ranges, adjust the opening degree of the shutter member so as to implement a selected one of the plurality of predetermined travel wind patterns which directs the travel wind to the second heat exchanger while blocking the travel wind from going from the grille opening to the first heat exchanger.

10. The vehicle according to claim 1, wherein the feedback system parameter comprises at least one of a coolant temperature of the engine, a vapor pressure on a high pressure side in a working fluid used for the recovery of the exhaust heat, a vapor temperature on the high pressure side, a liquid temperature on a low pressure side in the working fluid, and/or a flow rate of the working fluid.

11. The vehicle according to claim 10, wherein the feed forward system parameter comprises the external temperature, the feedback system parameter comprises the coolant temperature of the engine, and the control device is configured to, when the external temperature and the coolant temperature are within respective predetermined ranges, adjust the opening degree of the shutter member so as to implement a selected one of the plurality of predetermined travel wind patterns which directs the travel wind to the second heat exchanger while blocking the travel wind from going from the grille opening to the first heat exchanger.

12. The vehicle according to claim 1, wherein the feed forward system parameter comprises an external temperature, the feedback system parameter comprises a coolant temperature of the engine, and the control device is configured to, when the external temperature and the coolant temperature are within respective predetermined ranges, adjust the opening degree of the shutter member so as to implement a selected one of the plurality of predetermined travel wind patterns which directs the travel wind to the second heat exchanger while blocking the travel wind from going from the grille opening to the first heat exchanger.

13. The vehicle according to claim 1, wherein the first heat exchanger is positioned above the second heat exchanger, and the control device, depending on the feed forward and feedback system parameter inputs, is configured to select from the predetermined travel wind patterns a selected one of (γ) or (β); with (γ) having the shutter member arranged as to direct wind more toward the second heat exchanger than the first heat exchanger; and (β) having the shutter member arranged as to direct wind more toward the first heat exchanger than the second heat exchanger.

14. The vehicle according to claim 13, wherein the control device is configured to additionally chose an additional travel wind pattern (α) which is based on the shutter member arranged closed to preclude the travel wind from reaching the first and second heat exchangers.

15. The vehicle according to claim 1, wherein the first and second heat exchangers are both positioned, in a front to rear direction, between the shutter member and the engine.

16. A vehicle comprising:
a first heat exchanger disposed in an engine room and configured to be used for cooling of an engine;
a second heat exchanger that is disposed in the engine room, comprises an exhaust heat recovery system condenser, and is configured to be used for recovery of exhaust heat of the engine;
a shutter member configured to open and close a grille opening, the opening being provided in a front portion of the engine room;
a first sensor configured to detect a feed forward system parameter indicating a sign of a load increase in the first heat exchanger or the second heat exchanger;
a second sensor configured to detect a feedback system parameter indicating that a load in the first heat exchanger or the second heat exchanger has increased; and
circuitry configured to control opening and closing of the shutter member, wherein
the circuitry is configured to adjust an opening degree of the shutter member on a basis of the feed forward system parameter and the feedback system parameter to guide a travel wind through the grille opening and toward a respective one or both of the first heat exchanger and the second heat exchanger so as to implement one of a plurality of predetermined travel wind patterns that direct the travel wind past the shutter member and toward the respective one or both of the first and second heat exchangers on the basis of the feed forward system parameter input and the feedback system parameter input to the control device.

17. The vehicle according to claim 1, wherein the exhaust heat recovery system condenser is a Rankine cycle condenser.

18. The vehicle according to claim 16, wherein the first and second heat exchangers are both positioned, in a front to rear direction, between the shutter member and the engine.

19. The vehicle according to claim 18, wherein the first heat exchanger is positioned above the second heat exchanger, and the circuitry, depending on the feed forward system parameter input and the feedback system parameter input, is configured to select from predetermined travel wind patterns based on (γ) or (β); with (γ) having the shutter member arranged as to direct wind more toward the second heat exchanger than the first heat exchanger; and (β) having the shutter member arranged as to direct wind more toward the first heat exchanger than the second heat exchanger.

20. The vehicle according to claim 19, wherein the circuitry is configured to additionally chose from an additional predetermined travel wind pattern (α) which is based on the shutter member arranged closed to preclude the travel wind from reaching the first and second heat exchangers.

* * * * *